Aug. 11, 1936.  O. SCHRIEVER  2,050,737
LIGHT TRANSLATING APPARATUS
Filed July 3, 1933
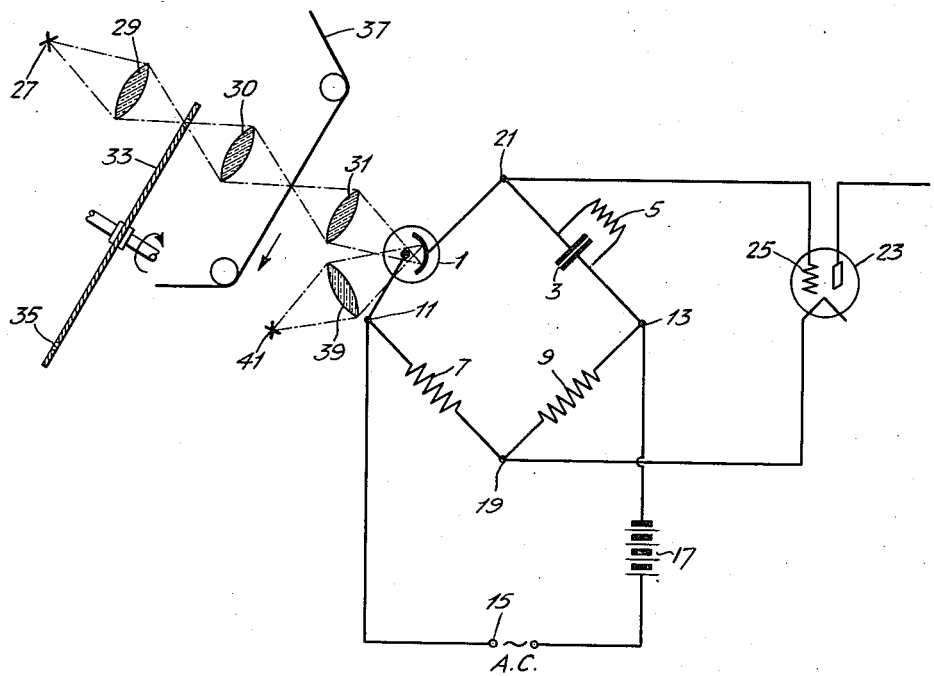
INVENTOR
OTTO SCHRIEVER
BY H. S. Grover
ATTORNEY Patented Aug. 11, 1936

2,050,737

UNITED STATES PATENT OFFICE

2,050,737

LIGHT TRANSLATING APPARATUS

Otto Schriever, Berlin, Germany, assignor to Telefunken Gesellschaft für Drahtlose Telegraphie m. b. H., Berlin, Germany, a corporation of Germany Application July 3, 1933, Serial No. 678,985
In Germany July 11, 1932

4 Claims. (Cl. 250—41.5)

The present invention relates to light translating systems and particularly to a system by which the capacity effect of the photoelectric light translating element may be compensated.

One object of this invention is to provide means for easily adapting a light translating system for either positive or negative transmission of the controlling light values.

It is known in the earlier art that photocells may be worked with when an alternating current voltage is applied to the cell electrodes. The frequency of the alternating voltage determines the carrier frequency further to be amplified. In order to preclude or neutralize the harmful effect of the electrode capacitance of the photoelectric cell, it is necessary that the alternating current flowing through the cell by virtue of capacity should be compensated. This compensation is accomplished most conveniently by the aid of a bridge arrangement in which the electrode capacity is balanced by a suitable condenser.

However, practical observation has shown that the neutralization by a capacity of the order of magnitude of the capacity of the photocell electrodes is alone not sufficient. In fact, because of the smallness of the capacity values under consideration, to insure a clear-cut bridge balance, the resistance component of both bridge arms must be carefully balanced. Theoretically speaking, it should be sufficient to connect as much resistance in parallel with the particular bridge arm (that is, either the photocell or the equalizing condenser) having the lowest leakage as will make the currents in both arms identical. In practice, however, the use of a high variable resistance necessary for this balance is not feasible.

The above described difficulties are obviated by the present invention which provides ways and means for giving the bridge arm containing the compensating condenser from the outset the higher conductance, if required. This effect is provided by the parallel arrangement of a fixed high ohmic resistance across the compensating condenser. Balance is obtained by causing the conductance of the photoelectric cell to take the same value as said resistance. To accomplish this result a variable biasing light is preferably located in the vicinity of the photocell and the brightness of the lamp may be suitably varied within wide limits. The practical merit of such a scheme is that owing to the smooth continuous brightness regulation of the bias light the conductivity of that arm of the bridge which contains the photoelectric cell may be varied in a continuous manner to effect the desired balance.

For example, for the purpose of picture scanning such as in picture telegraphy or television work, the balancing process is accomplished by excluding from the photocell the light impulses coming from the picture or the scanning spot is adjusted to black in the picture and the brightness of the bias light varied until balance is obtained. If, now, light impulses are allowed to fall on the photocell, an alternating current is produced whose intensity is proportional to the intensity of the impinging light impulses. If, however, it is desired to reverse the current signals resulting from the picture, the full intensity of the light is permitted to fall on the photocell or the scanning spot is adjusted to white on the picture, and the balance effected by readjusting the brightness of the bias light. In this case, the resultant alternating current produced is inversely proportional to the intensity of the impinging light impulses. The system is therefore adapted for transmission of either positives or negatives.

The attached drawing shows one form of my invention.

In the embodiment of the invention shown in the accompanying drawing the photocell 1 is located to form one arm of the bridge circuit including the capacity 3 shunted by the resistor 5 forming the adjacent arm and the other two arms of the bridge being formed from resistances 7 and 9. Across one diagonal of the bridge between the terminals 11 and 13 there is supplied an alternating current voltage from a source conventionally shown as 15, and in series with this alternating current voltage direct current is applied from a source 17. The opposite diagonal of the bridge between the terminals 19 and 21 connect the bridge circuit with the grid cathode circuit of the amplifier 23 in known manner so that when the balance of the bridge circuit is upset, as will be hereinafter explained, varying voltages will be applied to the grid electrode 25 of the tube 23.

The function of battery 17 is to prevent distortion of the alternating current applied to the grid 25 of tube 23 and for this purpose the voltage of battery 17 must be equal to or greater than the peak voltage of the alternating current source 15, in order that anode of the photocell 1 is always maintained positive with respect to the cathode of said photocell 1. The battery 17 serves further to control the sensitivity of the photocell 1, since in general, as is well known in the art, the sensitivity of a photocell is a function of the potential difference between its anode and cathode.

In order to illuminate the photocell 1, a light source 27 directs the light through an appropriate optical system comprising lenses 29, 30 and 31 in the path of the light issuing from the source 27 toward the cell 1. There may be arranged, where desired, a rotary scanning element 33 or the equivalent which is provided with scanning apertures 35 and the image subject scanned may consist of a film 37 moving in the direction shown by the arrow so that as the disk or scanning element 33 is rotated in the direction shown light from successive elemental areas of the film will be caused to be projected upon the light sensitive electrode of the photocell. Simultaneous with the application of the variable intensity light to the photocell there is applied through an appropriate optical system 39 a biasing light from a source 41. The source 41 as was above pointed out is suitably controlled so that the brightness may be varied within appropriate limits.

With the resistor element 5 shunting the condenser 3 so as to compensate for the conductance effect of the photocell to a large degree, the biasing light applied functions as the means by which an accurate balance of the bridge circuit may be obtained. As was above pointed out, this balance may be obtained for maximum light or for minimum light, depending upon the presence or absence of an extreme black portion of the film subject 37 between the light source 27 and the photocell 1 at the time when the balance is obtained.

Many changes in the general characteristics of the invention, of course, may be made without departing from the spirit and scope of the above outlined disclosure and I therefore believe myself to be entitled to make and use any and all of these changes provided they fall fairly within the spirit and scope of the hereinafter appended claims.

Having now described my invention, what I claim and desire to secure by Letters Patent is the following:—

1. A light translating system comprising a photoelectric cell included as one arm of a bridge circuit, a parallelly connected resistance and condenser of higher conductance than the photoelectric cell forming an adjacent arm of the bridge circuit, means for illuminating the photocell with varying light intensities proportional to a signal indication which is to be produced, means for applying a biasing light value to the photocell to compensate for the higher conductance of the neutralizing a parallelly connected resistance and condenser connected in the bridge arm adjacent the photocell and an amplifier system connected across one diagonal and responsive to unbalanced conditions in the bridge circuit for producing in the output circuit thereof amplified electric signaling indications of the variable light impressed upon the photocell.

2. The method of operating light translating circuits wherein a light translating element forms one arm of a bridge which comprises the steps of supplying steady illumination to the light translating element for balancing the resistance component of the adjacent bridge arm and supplying variable light values to the light translating element to unbalance the bridge circuit to produce thereby a change in voltage across the diagonal of the bridge.

3. A light translating system comprising a bridge circuit having a light responsive element connected to form one leg thereof, a capacity shunted by a resistance forming an adjacent leg of the circuit, having a higher conductance than the light responsive element, resistance elements forming the other two legs of the bridge circuit, means for applying alternating current in series with direct current across one diagonal of the bridge, an amplifier connected across the opposite diagonal of the bridge, and means for simultaneously subjecting the light responsive element to constant and variable light intensities, said constant light serving to bias the light responsive device to compensate for the higher conductance of the parallelly connected capacity and resistance arm connected adjacent thereto, and the variable light serving to modulate the applied alternating current.

4. A light translating system comprising a photoelectric cell included as one arm of a bridge circuit, a parallelly connected capacity and resistance combination of higher conductance than the photoelectric cell forming an adjacent arm of the bridge circuit, means for illuminating the photocell with varying light intensities proportional to a signal indication which is to be produced, adjustable means for applying a biasing light value to the photocell to compensate for the higher conductance of the parallelly connected capacity and resistance combination in the bridge arm adjacent the photocell for two predetermined conditions of illumination of the photocell and an amplifier system connected across one diagonal and responsive to the unbalanced conditions in the bridge circuit for producing in the output circuit thereof amplified electric signaling indications of the variable light impressed upon the photocell.

OTTO SCHRIEVER.